United States Patent

Avery

[11] 4,202,406
[45] May 13, 1980

[54] HEAT EXCHANGE SYSTEM

[76] Inventor: Alfred J. Avery, 113 E. Thackery, Flint, Mich. 48505

[21] Appl. No.: 920,353

[22] Filed: Jun. 29, 1978

[51] Int. Cl.² .................................................. F24H 3/00
[52] U.S. Cl. ................................ 165/47; 165/DIG. 5; 165/DIG. 12; 165/33; 165/70; 165/71; 165/163; 137/386; 137/577
[58] Field of Search .................. 165/DIG. 12, 70, 163, 165/47, DIG. 5, 71, 33; 122/31 R, 32, 252, 114, 504; 126/377, 378; 62/238 E; 137/386, 577

[56] References Cited

U.S. PATENT DOCUMENTS

| 2,919,559 | 1/1960 | Koch | 62/314 |
| 3,946,802 | 3/1976 | Christenson | 165/35 |

FOREIGN PATENT DOCUMENTS

| 2304537 | 8/1974 | Fed. Rep. of Germany | 165/DIG. 12 |
| 2501165 | 7/1976 | Fed. Rep. of Germany | 165/DIG. 12 |

Primary Examiner—Albert W. Davis
Assistant Examiner—Margaret A. Focarino
Attorney, Agent, or Firm—Gifford, VanOphem, Sheridan & Sprinkle

[57] ABSTRACT

A heat exchange system is provided which transfers the heat from a fluid discharged from a device that utilizes a heated fluid, to fresh fluid in order to increase the temperature of the fresh fluid prior to feeding it into a heating tank. Thus, less energy is required to heat the fluid in the heating tank prior to its introduction into the device which utilizes heated fluid. After the heat has been exchanged, the discharged fluid is then expelled from the system. A fluid trap controls the fluid level in the heat exchanger to assure maximum heat transfer capability. An antisiphon valve is provided in the fresh fluid input of the heat exchange coil in order to prevent discharged fluid from contaminating the fresh fluid source in the event of a rupture in the heat exchance coil. The fluid trap is provided with a pressure activated gate valve which deactivates the fluid trap in the event that the fresh fluid intake pressure decreases below a predetermined level, and thus further prevents contamination of the fresh input fluid by the discharged fluid.

9 Claims, 2 Drawing Figures

HEAT EXCHANGE SYSTEM

BACKGROUND OF THE INVENTION

I. Field of the Invention

The invention relates generally to an energy conserving heat exchange system for use with an apparatus which utilizes heated fluid supplied by a fluid heater supply tank, and more specifically, to such a system which utilizes safety valves to prevent contamination of fresh fluid supply in the event that a rupture occurs in the system.

II. Summary of the Present Invention

A common example of devices which utilize a heated fluid is a dishwasher which utilizes heated water supplied from a water heater tank. The water which is supplied to the dishwasher is used to clean the dishes and collect debris and food particles which are removed from the dishes. When the washing cycle is completed, the water is drained from the dishwasher and it has been a common practice to discharge the water directly into a drain. Such a system is disadvantageous in that the discharge fluid contains a substantial amount of heat energy which is wasted and lost when the fluid is drained from the system. In addition, a substantial amount of energy is expended in heating fresh water which is supplied to the water heating tank so that high temperature water is available for the dish-washer. Thus, it would be advantageous to provide a heat exchanger so that the heat energy contained in the fluid discharged from the dishwasher could be transferred to fresh fluid. Thus, less energy need be expended to heat the fresh water once it enters the water heater tank. In this manner the operating costs of the dishwasher can be substantially reduced.

In addition, it is further advantageous to provide such a heat exchange system in which the contaminated discharge fluid is prevented from coming in contact with the fresh fluid. Although such a separation of fluids is commonly provided in heat exchange systems during normal operation of the system, a rupture in the heat exchanger will permit the two fluids to come in contact with each other and thereby contaminate the fluid throughout the fluid system. Furthermore, a substantial decrease in pressure of the fresh fluid at the input of the system can cause contaminated fluid to flow toward and contaminate the fresh water source. Thus, it would be advantageous to provide a safety mechanism by which contaminated fluid is prevented from flowing into the fluid heater tank or into the fresh fluid supply.

SUMMARY OF THE INVENTION

The present invention obviates disadvantages and provides the advantages identified above by providing a heat exchange system having safety valves which prevent fluid which is contaminated after a rupture in the system from entering the fluid heater tank or the fresh fluid source. It is to be understood that the heat exchange system of the present invention will be described by way of example, i.e., a dishwasher system in which the heated fluid is water although the heat exchange system is not necessarily so limited and can be used with other devices utilizing heated fluid flow.

By way of example, the system of the present invention generally comprises a dishwasher, a water heater tank which supplies heated water to the dishwasher, a heat exchanger tank which receives water discharged from the dishwasher after the dishwashing operation has been completed, and a fluid trap communicating with the fluid outlet of the heat exchange tank which is adapted to control the level of fluid in the heat exchange tank in a manner to be described hereinafter. A coil of tubing is disposed within the heat exchange tank and has an input which communicates through appropriate pipes with an antisiphon valve, which in turn communicates through an appropriate pipe with a fresh water source. The outlet of the coil pipe communicates through an appropriate pipe with the water heater tank. As the discharged fluid flows into the top of the heat exchange tank, it passes around the coil disposed within the tank and thus transfers the heat absorbed in that fluid to the fluid contained within the coil pipe. The fluid then continues to flow to the bottom of the tank and is expelled through the outlet to the fluid trap.

A gate valve controls the flow of fluid through the trap so that the fluid can be directly discharged from the system or, if desired, can be directed upward through the tubing of the fluid trap. The height of the fluid trap is substantially the same as the height of the coil in the heat exchange tank so that the pressure of the fluid maintained in the fluid trap exerts an equal pressure on the fluid within the heat exchange tank to maintain the fluid in the tank at a height sufficient to envelope substantially the entire coil. Thus, the fluid maintains contact with the entire coil to permit maximum heat transfer from the fluid in the tank to the fluid within the coil. The gate valve opens in response to a pressure sensor disposed within the input line to the coil. When the pressure in the line decreases a predetermined amount, the gate valve opens to permit fluid to bypass the fluid trap and discharges the fluid directly from the system. Since the fluid trap is then disengaged from the system, the fluid level in the heat exchange tank decreases so that the discharged fluid is no longer in constant contact with the coil. Therefore, if a rupture occurs in the coil, none of the discharge fluid will be able to enter the coil and contaminate the fresh fluid therein. In addition, the valve is also manually operable so that the system may be drained when desired. A wind switch communicating with the fresh fluid input, can be activated to open the fluid trap gate valve and to permit fresh fluid to be introduced into the heat exchange tank in order to flush out the heat exchange tank.

BRIEF DESCRIPTION OF THE DRAWING

The heat exchange system of the present invention will be more clearly understood by reference to the accompanying drawings in which like reference characters refer to like parts in each view and in which.

DETAILED DESCRIPTION OF THE INVENTION

Figure 1:
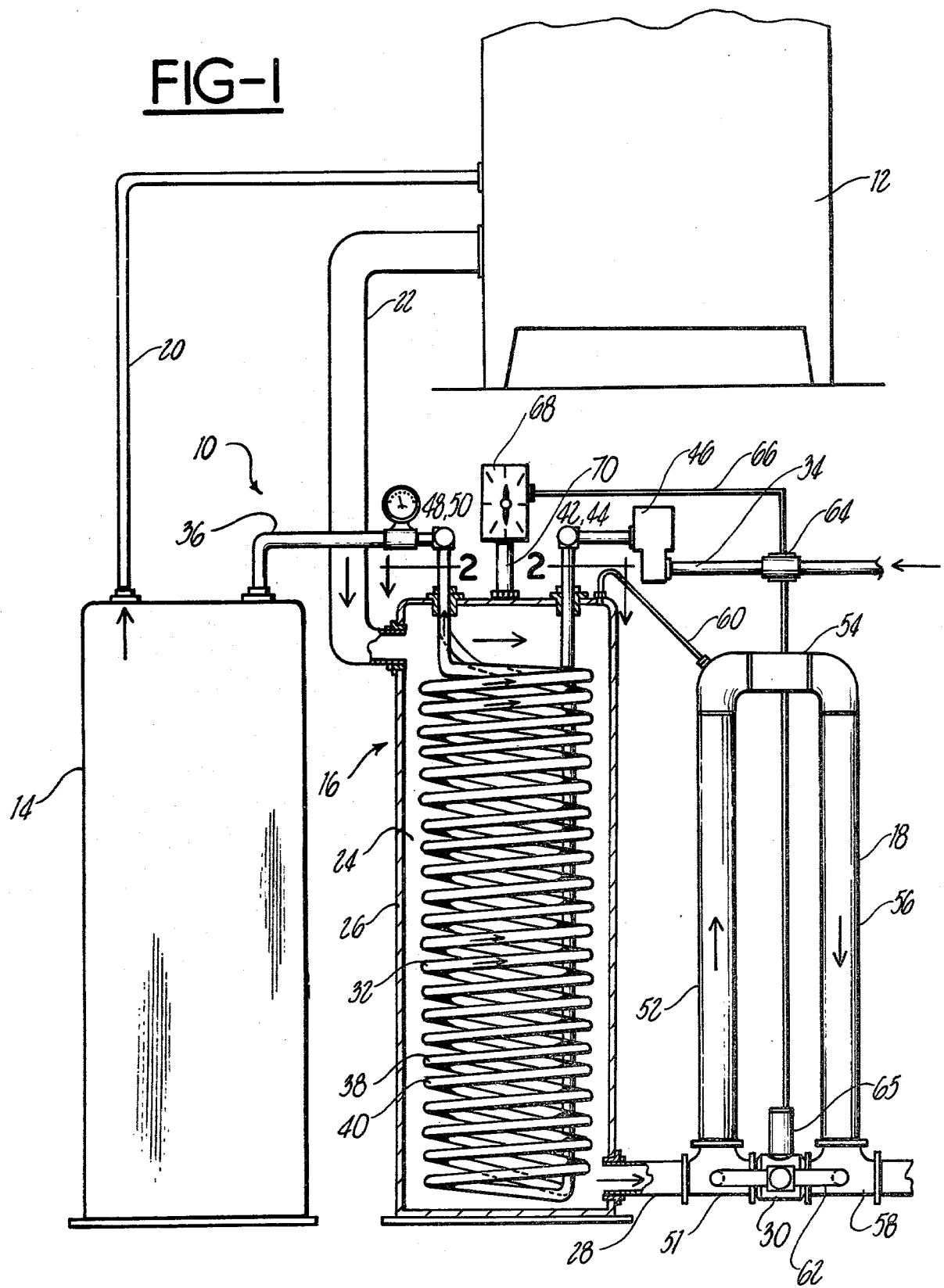
FIG. 1 is a schematic view of the heat exchange system of the present invention.
Figure 2:
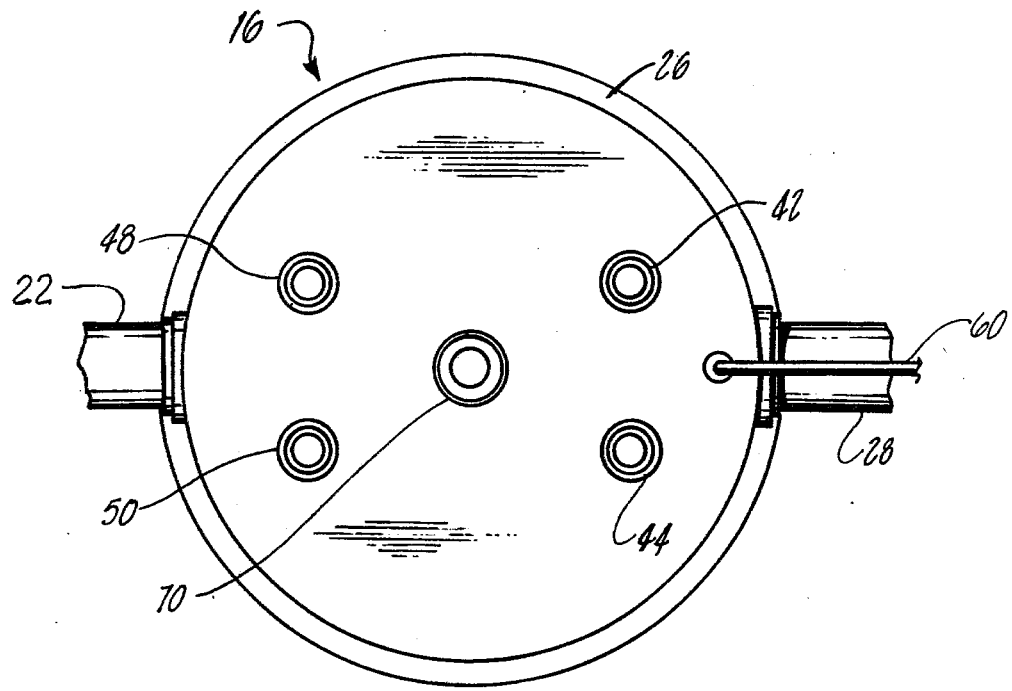
FIG. 2 is a top plan view of the heat exchange tank of the system shown in FIG. 1.

With reference now to FIG. 1, the heat exchange system 10 is thereshown connected to a dishwasher 12. The system generally comprises a water heater tank 14, a heat exchange tank 16, and the fluid trap 18. Water is heated and then stored at the increased temperature in the tank 14, and is then supplied under line pressure through an appropriate fluid passage 20 into the dishwasher 12. After the dishwashing cycle has been completed, water is discharged from the dishwasher 12 through an appropriate fluid passage or pipe 22 into the interior chamber 24 of the heat exchange tank 16 at the upper end of the heat exchange tank housing 26. Water is expelled from this heat exchange tank 16 through outlet passage 28 at the bottom of the housing 26. The outlet 28 communicates with the fluid trap 18 and the gate valve 30, such that when the gate valve 30 is closed, the fluid flows up into the fluid trap 18, but when the valve 30 is open, the fluid continues past the fluid trap 18 toward a drain (not shown) and out of the system. A coil of pipe 32 is disposed within the chamber 24 of the tank 16 and communicates at one end with the fresh fluid input pipe 34 in a manner to be hereinafter described. The other end of the coil 32 communicates through an appropriate input pipe 36 with the interior of the heater tank 14.

The heater tank 14 is preferably made and operates as a conventional commercial water heater. Fresh water is fed into the tank and is heated to a predetermined temperature. The heated water is then stored in the tank and maintained at that predetermined temperature until it is to be used, at which time appropriate valves may be opened to permit flow of the heated water under line pressure from the water heater tank. As shown in FIG. 1, water is supplied to the heater tank 14 by the pipe 36 which communicates with the outlet end of the coil 32 disposed within the heat exchange tank 16.

The heat exchange coil 32 of the present invention is preferably made of two coiled pipes 38 and 40 which are coaxially, interspirally positioned within the chamber 24 of the heat exchange tank 16. The inlets 42 and 44, respectively, of the pipes 38 and 40 extend exteriorly of the tank housing 26 and are connected to the fluid input line 34 through an antisiphon valve 46. In the event that the fluid pressure within the pipe 34 becomes less than the fluid pressure within the coil 32, or in the event that the pressure within the chamber 24 exceeds the pressure of the fluid in the coil 32, and a rupture occurs in the coil 32, the fluid in the coil 32 is prevented from flowing back into the fluid input pipe 34. The outlet ends 48 and 50, respectively, of the coil pipes 38 and 40 extend exteriorly of the tank housing 26 so as to communicate with the water heater input pipe 36. As the fluid, which is discharged from the dish-washer 12 through the pipe 22, enters the chamber 24 near the top of the tank housing 26 it passes over and around the coil 32 and is expelled from the tank 16 by the outlet 28 at the bottom of the housing 26.

The outlet 28 communicates with one end of a T-shaped pipe connector 51. The opposing end of the T-shaped connector 51 communicates with the gate valve 30 and the intermediate end communicates with an outwardly extending pipe leg 52 of the fluid trap 18. When the gate valve 30 is closed, the discharged water is forced to flow from the outlet 28 through the intermediate end of the T-connector, up through the pipe 52 into the U-shaped portion 54 of the fluid trap 18, and down through the pipe leg 56. The lower end of the pipe 56 communicates with the intermediate end of a second T-shaped pipe connector 58 which is connected at one end to the other side of the gate valve 30, and the opposing end of which is connected to a drain (not shown) so that the discharged water is expelled from the system. Conversely, when the valve 30 is opened, the water travels through the outlet 28 into one end of the T-shaped connector 51 and directly out of the opposing end, through the valve 30, and into one end of the second T-connector 58 and directly out of the opposing end of the second connector 58 into the drain. The U-shaped connecting portion 54 of the fluid trap 18 is positioned at substantially the same height as the top coil of the coil 32 which, in addition, is substantially the same height as the connection between the pipe 22 and the tank housing 26. When the valve 30 is closed, and due to well-known fluid pressure principles, the pressure of the water maintained in the fluid trap 18 stabilizes the level of the discharged water within the chamber 24 at the same height. An air passage conduit 60, which communicates at one end with the U-shaped tube 54 and at its other end with the top of the tank housing 26, insures an equalization of the fluid pressure within the fluid trap 18 and the heat exchange tank 16. Thus, the prolonged contact of the discharged water with the coil 32 provides a maximum heat transfer to the fluid in the coil prior to expelling the discharged water.

The valve 30 can be opened and closed manually by appropriate means such as the handle 62 and can also be automatically controlled as follows. A pressure sensor 64 communicates with the input pipe 34 at a point preceding the connection of pipe 34 to the antisiphon valve 46. When the fluid pressure within the pipe 34 decreases below a predetermined level, a gate actuator or solenoid 65 opens the pressure gate of the valve 30. Thus the discharged water bypasses the fluid trap and exits from the system as previously described. Since no fluid remains in the fluid trap, the pressure which maintains the level of fluid within the heat exchanger tank 16 is lost. Thus, the level of discharged water in the chamber 24 is no longer maintained at a height substantially equal to the height of the coil 32 and, therefore, flows freely past the coil 32 and is expelled from the chamber 24 through the outlet 28. Thus, although maximum heat transfer from the discharge fluid to the fluid within the coil 32 is no longer possible, the pressure of the discharge fluid is no longer sufficient to cause the dirty discharge fluid to enter a rupture in the coil and mix with the fluid contained within the coil. Therefore, contamination of the fresh water in the coil that is supplied to the water tank 14 is prevented.

A wind switch 68 is electrically connected to the pressure sensor 64 and is operable upon being actuated to energize the pressure sensor 64 for a preset time to thereby open the valve 30. With the valve 30 opened, water passes from pipe 22 through the chamber 24 of tank 16 and out outlet 28 directly to the connector 58 to flush the tank 16.

During normal operation of the system, the fluid pressure of the water in the input pipe 34 from the water source is sufficient to permit the valve 30 to be closed. Thus, the water flows through the pipe 34 into the valve 46 and in turn into the inlets 42 and 44, respectively, of the coil pipes 38 and 40. Since the inlets 42 and 44 extend downward into the chamber 24 for substantially the entire length of the chamber and the pipes 38 and 40 are then coiled upwards to reach substantially the same height as the connection of the pipe 22 to the housing 26, the water flows downward through the inlets and then upwardly through the coil 32 into the heater tank 14. Since the valve 30 is closed, discharge water within the trap 18 provides sufficient pressure to maintain the level of discharge water within the chamber 24 at a height substantially equal to the height of the coil 32. Therefore, the coil pipes 38 and 40 are in constant communication with the discharged water within the chamber 24. This constant contact permits heat to be transferred from the higher temperature discharged water to the fresh water within the coils 38, 40. Thus, the fresh fluid is preheated before passing through the outlets 48, 50 respectively of the pipes 38, 40 and into the passage 36 communicating with the interior of the heater tank 14. Since the water fed to the tank 14 has been sufficiently preheated, less energy must be expended by the heater within the tank 14 to raise the temperature of the water within the tank 14 to a predetermined temperature.

In a simple heat exchange system, operating as described in the paragraph above, a rupture in one of the pipes 38, 40 would cause a decrease in the fluid pressure in the input line 34. Without the safety devices off the present invention, discharged water surrounding the coil 32 could be forced into the rupture and would thereby contaminate the fresh water which is supplied to the water heater tank 14. However, the pressure sensor 64 of the present invention operates to detect such decreases in the fluid pressure and thereby operate the valve 30 so that discharged fluid is no longer maintained within the chamber 24 at a pressure greater than the pressure within the coil 32. In addition, the antisiphon valve 46 prevents the decrease of pressure through the line 34 from forcing the fluid within the coil 32 to flow backwards and contaminate the source of the fresh water.

Having thus described my invention by way of example, many modifications thereto will become apparent to those skilled in the art to which it pertains without deviating from the scope or spirit of the invention as defined by the appended claims.

What is claimed is:

1. A heat exchanger system comprising
   a fluid
   a heat exchange tank having an outer housing which encloses an inner chamber and having a coil of tubing disposed in said chamber, said tubing having an inlet portion and an outlet portion both of which extend exteriorly of said tank, and said housing having inlet and outlet portions which communicate with said chamber,
   a fluid trap communicating with the outlet of said heat exchange tank housing to receive fluid from the chamber and elevate it to a height sufficient to provide adequate fluid pressure in the chamber to maintain the fluid in the chamber at substantially the same height as the top of said coil,
   a fluid supply tank having means for heating the fluid disposed therein and communicating with the outlet of said coil,
   means for extracting and utilizing the fluid from said fluid heater supply tank,
   a first pipe communicating with said last-mentioned means to transfer the used fluid from said last-mentioned means to the inlet of said heat exchanger tank housing, and
   means for providing fluid from an external source and introducing it into the inlet of said coil.

2. The invention as described in claim 1 wherein said fluid trap comprises a substantially inverted U-shaped pipe structure having a first valve intermediate the shanks of the U-shaped structure at the open end of said structure, which valve communicates with the fluid flowing into said trap so that the fluid flow from said chamber can be directly expelled from the system when the valve is opened, and to flow through the U-shaped pipe structure when the valve is closed.

3. The invention as defined in claim 2 further comprising means for sensing the pressure of the fluid in said means for providing fluid from an external source and wherein said first valve is responsive to said means for sensing pressure.

4. The invention as defined in claim 3 further comprising a manually operable switch which is adapted to control the means for pressure sensing which governs the position of said first valve when said switch is maintained in a first position, and to permit said means for sensing the pressure to solely control the position of said valve when said switch is in a second position.

5. The invention as defined in claim 3 wherein said valve remains closed when the pressure of the fluid in said means for providing fluid from an external source remains constant and wherein said valve opens when the pressure of that fluid decreases by fifty percent (50%) of the constant value.

6. The invention as defined in claim 1 wherein said coil comprises a pair of coiled pipes coaxially and interspirally positioned with respect to each other.

7. The invention as defined in claim 1 wherein said means for extracting and utilizing the fluid from said fluid supply tank comprises
   a second pipe communicating at one end with the fluid in the fluid supply tank, and
   a washing machine having its water inlet secured to and communicating with the other end of said pipe and its water discharge line secured to and communicating with said first pipe.

8. The invention as defined in claim 1 and further comprising an antisiphon valve communicating with said means for providing fluid from an external source and adapted to permit fluid flow through said last-mentioned means only in the direction toward the inlet of said coil.

9. The invention as defined in claim 1 and further comprising a venting tube which communicates between the upper portion of the chamber in said heat exchange tank and the upper portion of said fluid trap.

* * * * *